United States Patent Office 3,207,818
Patented Sept. 21, 1965

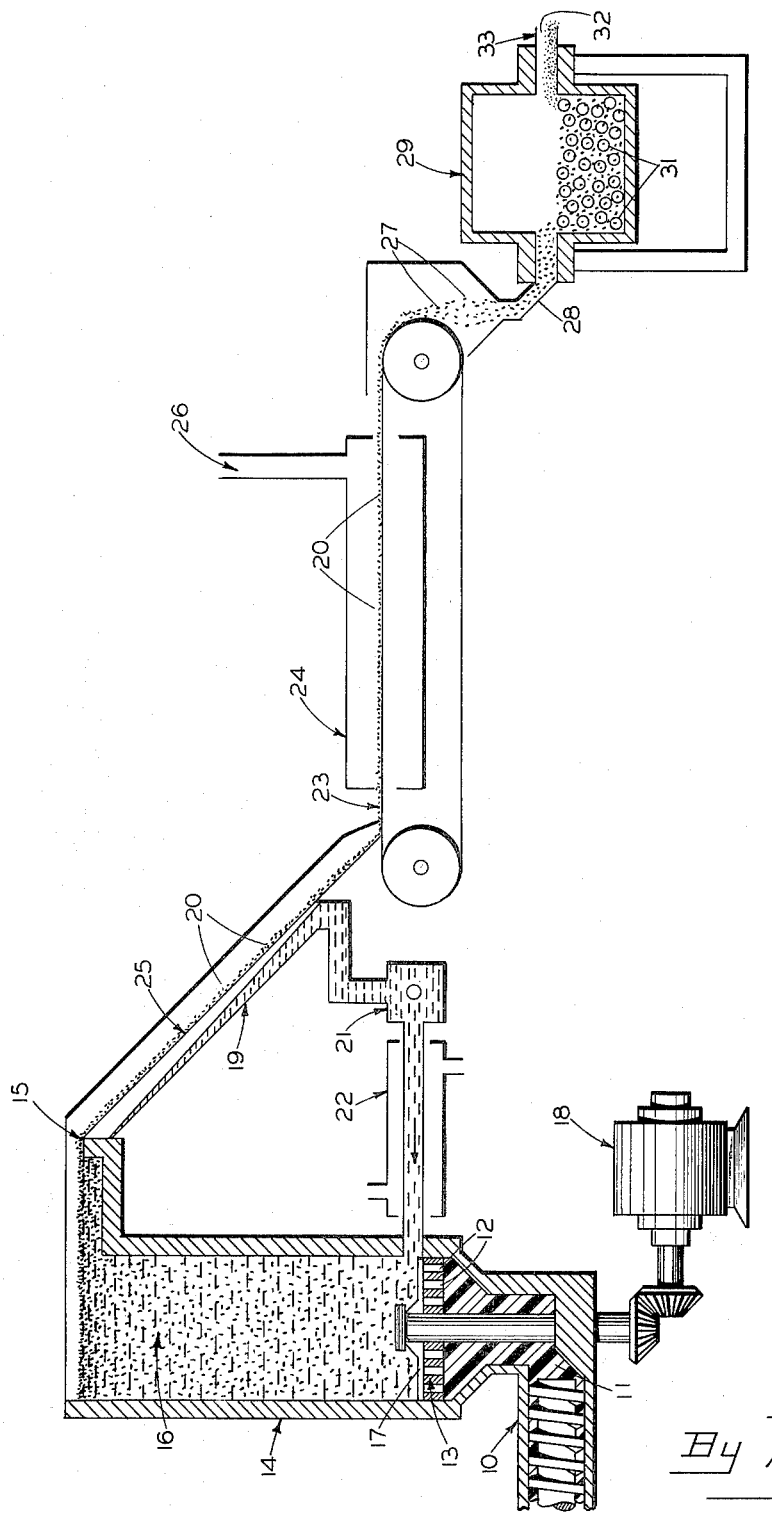

3,207,818
METHODS OF FORMING SPHERICAL PARTICLES OF CRYSTALLIZABLE THERMOPLASTIC POLYMERS
Donald I. Marshall, Princeton, N.J., assignor to Western Electric Company, Incorporated, New York, N.Y., a corporation of New York
Filed Dec. 27, 1963, Ser. No. 333,961
8 Claims. (Cl. 264—14)

The present invention relates generally to methods of forming minute, generally spherical particles of a crystallizable thermoplastic polymer, and more particularly to methods of forming spherical particles of isotactic polypropylene having a substantially uniform, controlled diameter and a bulk density as high or higher than that obtainable from other processes, such as suspension polymerization or solution polymerization.

Accordingly, the general objects of the invention are to provide new and improved methods of such character.

Powdered or comminuted thermoplastic resins, for example, polypropylene, are useful in many industrial processes, either as a dry powder or in combination with a liquid vehicle. One example of increasing industrial prominence is the fluidized-bed coating process, such as disclosed in E. Gemmer Patent 2,844,489. In that process, comminuted plastic of extremely fine particle size is desirable for many applications, and it is important that the particle size be as uniform as is practically obtainable. In addition, spherical particles are particularly advantageous for use in that process. Other processes requiring free flowing particles of thermoplastic resins are, for example, electrostatic powder coating, rotational molding and shell molding.

A further object of the invention is to provide new and improved methods of forming substantially uniform, minute spheres of a crystallizable thermoplastic polymer for use in powder plastic processes, such as fluidized-bed coating.

Polyolefin powders, including polypropylene, have been relatively difficult and expensive to prepare, requiring relatively expensive grinding operations in which it has been somewhat difficult to obtain uniform particle size and impossible to obtain spherical particles.

Another object of the invention is to provide new and improved methods of forming minute spherical particles of crystallizable polymers, particularly polypropylene.

With the foregoing and other objects in view, a method embodying certain features of the invention begins with the step of forming a solution of about 10 to 70% by weight of a crystallizable thermoplastic polymer in a solvent. Next, the solution is formed into individual droplets, which are cooled in a bath of an immiscible cooling liquid, such as water. The temperature of the bath is maintained at a value such that the polymer precipitates into the form of clusters of minute spheres of the polymer loosely bound together. The cooling step in such a bath prevents evaporation of the solvent during precipitation and the attendant formation of a polymer skin which inhibits later solvent removal and particle dissociation. The clusters thus formed are then separated from the cooling liquid and the solvent is evaporated therefrom. Finally, the solvent-free clusters are broken up, as by gentle rubbing, into the individual spheres of the polymer.

The diameter of the spheres is controlled by regulating the cooling rate, faster cooling providing smaller spheres. The step of forming the individual droplets of the solution is conveniently carried out by extruding the solution directly into the cooling bath, and cutting the extrudate intermittently to form individual "droplets" as it enters the bath. Preferably, the droplets are lighter than the cooling liquid so that they float individually to the surface while being cooled in the process.

Other objects, advantages and aspects of the invention will become apparent from the following detailed description of specific embodiments thereof, when taken in conjunction with the accompanying drawing, illustrating diagrammatically a preferred form of equipment for practicing the invention.

Referring now in detail to the drawing, the manipulative steps involved in a preferred embodiment of the invention, as applied to any suitable polymer-solvent combination, will first be described in connection with the equipment used to carry out the method. In accordance with this embodiment of the invention, a screw-type extruder 10 of generally conventional design is used to form a thoroughly blended solution 11 of the polymer and solvent and to impel the solution within the extruder continuously to the right, as viewed in the drawing. The extruder barrel and/or screw is heated in well-known fashion to a predetermined temperature required to bring the solution to a desired extrusion temperature. The optimum extrusion temperature varies for different polymer-solvent solutions, but must be sufficient to insure both complete solution and sufficient fluidity for extrusion, but low enough to avoid boiling of the solution during the crystallization of the polymer.

At the discharge end of the extruder 10, the solution 11 is extruded in a plurality of fine streams through orifices 12—12 in a die plate 13. Preferably, the die plate 13 is circular and the orifices are arranged in concentric rings around the die plate. The number of orifices is related to the desired production rate in view of the diameter of the orifices, 50 to 100 orifices being a good operating range for many applications. While the orifice diameter is not particularly critical, a diameter of the order of 50 to 100 mils is preferred for many applications.

As the extrudate emerges from the orifices 12—12, it passes directly into the bottom of a cylindrical tank 14 containing a bath 16 of cooling water, or other immiscible cooling liquid. As the streams of solution enter the bath 16, they are intermittently cut into small cylinders or pellets by a plurality of continuously rotating blades 17—17 which travel against or very close to the upper surface of the die plate 13. The blades 17—17 sweep at intervals across the orifices 12—12 to cut the extrudate streams intermittently into pellet form.

The blades 17—17 are driven by a motor 18 in timed relation to the speed of the extruder screw (through conventional control devices not shown) to govern the lengths of the individual pellets of the polymer-solvent extrudate solution. A length approximately equal to the diameter is optimum for close temperature control. The individual cylinders of the polymer-solvent solution thus formed adjacent to the bottom of the cooling bath 16 will be referred to hereinafter in the description and claims as "droplets." Other methods of forming the solution into individual droplets, pellets or the like could be use; for example, by using a reciprocating piston pump with reciprocating knives below the apertures.

As the droplets are formed and swept free of the die plate 13 by the rotating knives 17—17, they float to the surface of the cooling bath 16 because, in this embodiment, the droplets of plastic-solvent solution are less dense than the cooling liquid selected for the bath. Preferably, the solvent and cooling medium are selected so that the droplets will float slowly to the surface of the bath providing sufficient time for crystallization of the polymer. Ordinarily, there is no problem in this selection and water will suffice as the cooling medium. Other suitable cooling media are mixtures of alcohols with water, including mono-, di- and/or tri-alcohols (e.g., ethyl alcohol, glycols and glycerols). It would also be possible to operate with a denser solvent, in which case the droplets would enter the bath at or near the top and then sink slowly to the bottom.

The water bath is maintained at a predetermined temperature below the extrusion temperature and below the crystallization temperature of the polymer involved, so that the individual droplets are cooled as they rise to the surface of the bath 16. It is important that the bath temperature be sufficiently low, having regard to the height of the cooling bath above the point at which the droplets are introduced, that the polymer is completely precipitated (crystallized) within each droplet before the droplets reach the surface of the bath 16. A typical bath height might be from two to ten feet.

The polymer precipitates within each droplet in the form of a cluster of minute (usually .0001 to .005-inch diameter), generally spherical particles of the polymer, hereinafter referred to as "spheres," loosely bound together. The individual sphere formation is regarded as resulting from a seeding effect in that molecules of polymer first crystallize at various points in the droplet, and adjacent molecules thereafter precipitate in a regular spherical pattern on the surface of the seed crystal until all of the polymer has been precipitated.

When the polymer is thus crystallized under water or some other suitable inert cooling liquid, the precipitation proceeds without evaporation of the solvent. This avoids the formation of a film or skin of the solvent on the surface of the droplets which retards further solvent removal. The solvent collects in any available space, being distributed between the spheres, within the spheres and outside the droplets.

As fully crystallized clusters float to the top of the tank 14, they are continuously removed from the tank 14 by flowing with a controlled excess of the cooling liquid 16 over a weir 15 at the upper end of the tank. The clusters then pass down an inclined screen 25, which serves to drain off the excess cooling liquid to a collecting trough 19. The separated clusters are designated by the numerals 20—20. From the trough 19, the excess cooling liquid is fed by a pump 21 back to the bottom of the tank 14 through a heat exchanger 22, which serves to cool the liquid to a predetermined temperature designed to maintain the bath temperatures at the desired levels. It should be noted that, in the preferred embodiment, the flow of cooling liquid is concurrent, to provide the greatest cooling effect as the droplets are first swept away from the die plate 13. Also, the continuous in-flow of cooling liquid near the bottom of the tank 14 assists in sweeping the newly formed droplets of polymer-solvent solution away from the die plate 13 and the blades 17—17.

The separated-and-drained clusters 20—20 are next deposited on a flat conveyor 23, which functions to carry them through a drying oven 24. In the oven 24, the solvent is completely evaporated from the clusters. In the preferred embodiment illustrated, the oven 24 is a hot air oven in which hot air is blown through an inlet pipe 26 counter-currently past the advancing clusters 20—20 on the belt 23.

The solvent-free clusters (designated by the numerals 27—27) then advance through a chute 28 to a mill 29, which applies a gentle rubbing to break up the clusters into the individual spheres of the polymer without crushing the spheres. A suitable form of mill 29 illustrated in the drawing is a ball mill having small diameter, light-weight balls 31—31; for example, balls of a specific gravity 1 to 2 in a polymer-to-ball ratio of 0.8 to 2.0. The finished spherical particles 32—32 of polymer emerge from the mill 29 through an outlet port 33 and are ready for use. The particles may be screened, if necessary, to remove any oversized particles remaining from the milling step. Oversized particles consisting essentially of unseparated clusters are then recycled on the conveyor 23 for further milling. There is ordinarily a negligible amount of fines or dust, because the spheres formed in accordance with the invention are stronger and more resistant to breakage than the clusters which tend to be frangible at the sphere boundaries.

Applicant is aware that D. C. Hull et al. Patent 2,918,701, granted December 29, 1959, discloses the formation of large, roughly spherical pellets of undiluted polyolefins using physically similar extrusion and cutting techniques, followed by cooling under water. The present invention is regarded as an improvement over that patent primarily in the initial formation of a polymer-solvent solution, the precipitation of minute individual spheres of the polymer within each droplet, the evaporation of the solvent from the clusters, and the separation of the individual spheres within the clusters.

As previously discussed, the methods of this invention may be used to form minute, generally spherical particles of various thermoplastic polymers which are crystallizable and which in combination with a suitable solvent will crystallize to a dense spherical particle easily broken away from its neighboring particles. The following specific examples relating to the preparation of polypropylene spheres are, therefore, set forth as illustrative of the practice of the invention.

*Example I*

A first specific example of a method in accordance with the invention involves the preparation of minute spheres of an isotactic polypropylene, for example, isotactic polypropylene, manufactured by the Hercules Powder Company and designated "Profax 6512E." This material is a crystallizable thermoplastic polymer having a melting point of about 170° C. and a flow grade (ASTM D-1238, 57, 230° C., 2160 grams) of 2.5 decigrams per minute. In the specific example, this material was dissolved in xylene to a concentration 20% by weight of the polymer at a temperature of 125° C. The boiling point of xylene is 136° C.

Individual droplets of the solution were cooled as rapidly as practicable in ice water to room temperature (about 20° C.) in a period of about three (3) to five (5) seconds. The cooled particles were removed, the xylene driven off and the resulting spheres separated. The average sphere diameter was 0.3 mil and the bulk density was .30.

*Example II*

In this example, a 20% solution of isotactic polypropylene was prepared in the same manner as in Example I; however, the droplets were cooled slowly in air to room temperature (about 20° C.), in about twenty (20) minutes. In this case, the particle size was about 3 mils and the bulk density was .34.

*Example III*

In this example, a 50% solution of isotactic polypropylene was prepared by blending a powdered isotactic polypropylene, which came directly from a suspension polymerization process and had irregular particles averaging 3 mils in size and a bulk density of .34, with equal parts by weight of decalin (decahydronapthalene). The mixture was then heated in a screw extruder to a temperature of 160° C., extruded and cooled in air to room temperature (about 20° C.) in approximately five (5) minutes. Generally spherical particles having a diameter of 1 mil were obtained which had a bulk density of .36.

The foregoing examples illustrate how the particle size may be controlled by regulating the cooling rate, with a diameter of from about 0.3 to about 3 mils being readily obtainable by varying the cooling conditions. It is to be noted that the slower cooling leads to fewer crystal nuclei and allows time for growth of the spherulite to large sizes. With the simple flotation cooling illustrated in the drawing, the cooling time can be controlled to maximize bulk density and control particle size. The optimum cooling rate for any given solution to obtain particles of a desired size may readily be determined empirically.

In practicing the method with isotactic polypropylene solutions, the preferred concentration of polypropylene is about 20 to 50% by weight, and the solution is preferably heated to a temperature of 130 to 160° C. prior to the introduction of the droplets into the cooling bath. The optimum coolant temperature is usually in the range from 40° C. to 100° C., and the cooling time between about twenty (20) seconds and five (5) minutes.

In general, for various polymers, including isotactic polypropylene, the process can employ concentrations within limits of 10% to 70% by weight of the polymer. Various specific hydrocarbon solvents may be used. In addition to xylene and decalin mentioned in the specific examples, such solvents as toluene, ethyl benzene and naphtha, may be conveniently used for polyolefins. The critical features of solvent selection reside in its physical properties; that is, the boiling point and solvent power, the latter controlling the crystallization temperature and the crystallization rate. The solvent must also be capable of evaporation from the clusters of polymer thus crystallized to leave the spheres of pure polymer in a solvent-free condition.

While isotactic polypropylene has been particularly discussed in the specific examples, other crystallizable thermoplastic polymers may be prepared in the same manner. Since the method relies solely on the physical properties of the material, any crystallizable thermoplastic polymer which will crystallize in the disclosed manner on cooling of a solvent solution in a bath of an inert cooling liquid may be used.

While various specific examples and embodiments of the invention have been described in detail hereinabove, it will be obvious that various modifications may be made from the specific details described without departing from the spirit and scope of the invention.

What is claimed is:

1. The method of forming minute, generally spherical particles of isotactic polypropylene, which comprises:
   preparing a solution of about 10% to 70% by weight of isotactic polypropylene in a solvent;
   forming the solution into individual droplets;
   cooling the individual droplets of the solution in an immiscible cooling medium to a temperature and for a time sufficient to precipitate the polypropylene within each droplet in the form of a cluster of minute spheres of the polypropylene loosely bound together, the polypropylene and solvent having characteristics permitting such precipitation of the polypropylene;
   evaporating the solvent from the clusters; and
   breaking up the solvent-free clusters into the individual spheres of isotactic polypropylene.

2. The method of forming minute, generally spherical particles of isotactic polypropylene, which comprises:
   preparing a solution of about 10% to 70% by weight of isotactic polypropylene in a solvent;
   forming the solution into individual droplets;
   cooling the individual droplets of the solution in a bath of an immiscible cooling liquid to a temperature and for a time sufficient to precipitate the isotactic polypropylene within each droplet in the form of a cluster of minute spheres of the isotactic polypropylene loosely bound together, the precipitation of the isotactic polypropylene in the bath of cooling liquid preventing evaporation of the solvent during precipitation, the isotactic polypropylene and solvent having characteristics permitting such precipitation of the isotactic polypropylene;
   separating the clusters thus formed from the cooling liquid;
   evaporating the solvent from the clusters; and
   breaking up the solvent-free clusters into the individual spheres of isotactic polypropylene.

3. The method as recited in claim 2, wherein the diameter of the spheres is controlled by regulating the cooling rate, faster cooling providing smaller spheres.

4. The method as recited in claim 2, wherein the step of forming the solution into droplets is accomplished by extruding the solution directly into the cooling bath, and cutting the extrudate intermittently as it enters the bath.

5. The method of forming minute, generally spherical particles of isotactic polypropylene, which comprises:
   preparing a solution of about 20% to 50% by weight of isotactic polypropylene in a hydrocarbon solvent;
   forming the solution into individual droplets;
   cooling the individual droplets of the solution in a bath of an immiscible cooling liquid to a temperature and for a time sufficient to precipitate the polypropylene within each droplet in the form of a cluster of minute spheres of the polypropylene loosely bound together, the precipitation of the polypropylene in the bath of cooling liquid preventing evaporation of the solvent during precipitation, the hydrocarbon solvent having a boiling point and solvent characteristics permitting such precipitation;
   separating the clusters thus formed from the cooling liquid;
   evaporating the solvent from the clusters; and
   breaking up the solvent-free clusters into the individual spheres of polypropylene.

6. The method in accordance with claim 5, wherein the solvent is xylene.

7. The method in accordance with claim 5, wherein the solvent is decalin.

8. The method of forming minute spherical particles of isotactic polypropylene, which comprises:
   preparing a solution of about 20% to 50% by weight of the polyproylene in xylene;
   extruding the solution at a temperature of from 120° to 140° C. into the bottom of a bath of cooling water;
   cutting the extrudate intermittently as it enters the bath to form individual droplets of the extruded solution in the water bath, the droplets being less dense than the water and, therefore, floating individually to the surface of the water;
   maintaining the water temperature sufficiently below the solution temperature to cool the individual droplets as they rise to the surface of the water bath to a temperature of 40° C. to 100° C. to precipitate the polyproylene within each droplet in the form of a cluster of microscopic spheres of the polypropylene loosely bound together, the water bath preventing evaporation of the solvent during precipitation;
   separating the clusters thus formed from the cooling water;
   evaporating the xylene from the clusters; and
   breaking up the solvent-free clusters into the individual spheres of polypropylene.

References Cited by the Examiner

UNITED STATES PATENTS

| | | | |
|---|---|---|---|
| 2,918,701 | 12/59 | Hull et al. | 264—14 |
| 3,029,466 | 4/62 | Guill | 18—1 |
| 3,070,835 | 1/63 | Alsys | 264—14 |

ALEXANDER H. BRODMERKEL, *Primary Examiner.*

ROBERT F. WHITE, *Examiner.*